Feb. 12, 1957   R. C. LAMOND   2,780,917
STEERING GEAR CONTROLS
Filed March 23, 1953   5 Sheets-Sheet 1

Inventor:
Robert C. Lamond
by his Attorneys
Howson & Howson

Feb. 12, 1957   R. C. LAMOND   2,780,917
STEERING GEAR CONTROLS
Filed March 23, 1953   5 Sheets-Sheet 4

Inventor:
Robert C. Lamond
by his Attorneys
Howson & Howson

United States Patent Office 2,780,917
Patented Feb. 12, 1957

2,780,917

STEERING GEAR CONTROLS

Robert C. Lamond, Philadelphia, Pa., assignor to American Engineering Company, Philadelphia, Pa., a corporation of Pennsylvania Application March 23, 1953, Serial No. 343,924

7 Claims. (Cl. 60—52)

This invention relates to improvements in steering mechanisms of the general class of those disclosed, for example, in United States Patents 1,986,640 and 2,111,594, and a principle object of the invention is to provide for such steering mechanisms an improved servocylinder device which includes within its own organization provision for the essential "storage motion" which heretofore has required the use of relatively complicated and expensive supplemental devices in the form of mechanical gear differentials, cam mechanisms and spring.

A primary object of the invention, therefore, is to materially simplify the mechanical control parts of steering mechanisms of the stated class.

Another object of the invention is to provide a control means for steering mechanisms of the stated class wherein full "storage motion" is available with minimum friction losses, thereby reducing to a minimum the turning force requirements of the mechanical control parts and affording accommodation for the limited electric power supply of the electric synchronous control system used to transmit the turning movement of the steering wheel to the mechanical control at the steering gear.

Still another object is to provide a novel control device for steering installations of the stated type affording free movement of the mechanical control parts of the installation when loss of power occurs, but without requirement for the prior conventional relatively expensive and complicated "storage motion" units.

Figure 1:
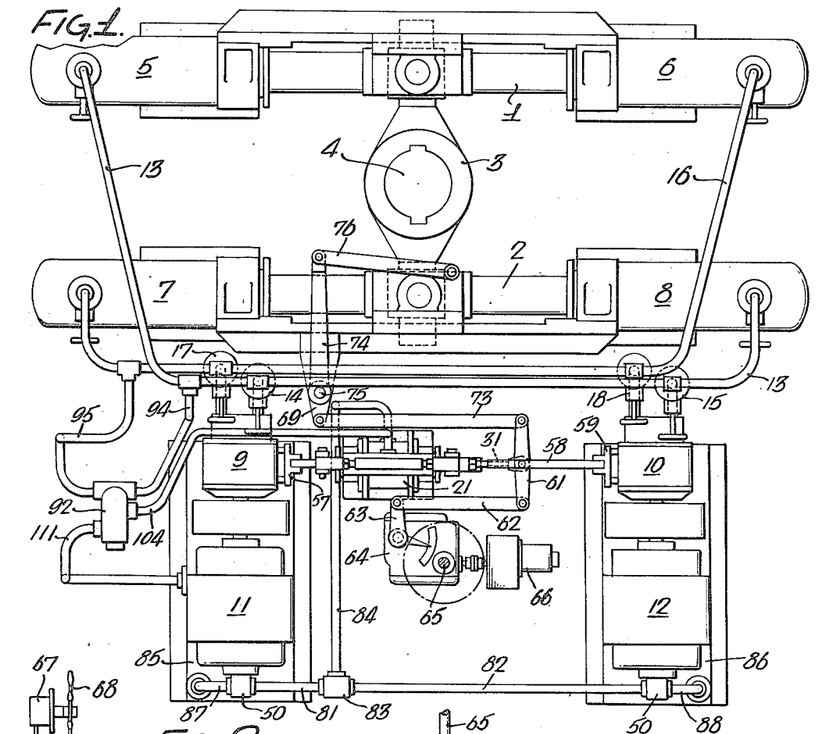
Figure 1 is a plan view of a steering mechanism made in accordance with the invention.
Figure 2:
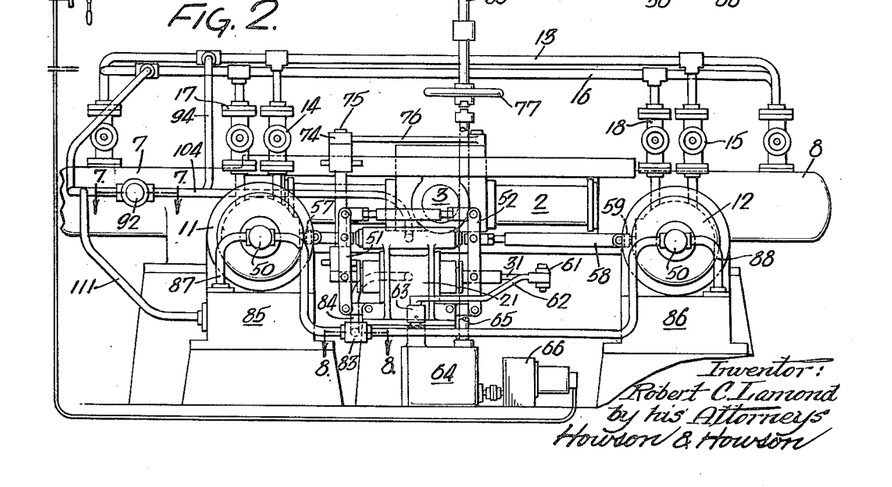
Figure 2 is a front elevation view of the mechanism.

With reference to Figures 1 and 2 of the drawings, the steering mechanism which, as previously stated, is of the general type illustrated in U. S. Patents 1,986,640 and 2,111,594, comprises a pair of hydraulic rams 1 and 2 which are operatively connected respectively to the opposite sides of a cross head 3, which in the present instance may be considered as attached directly to the rudder post 4 of a marine vessel. The opposite ends of the ram 1 will operate in hydraulic cylinders 5 and 6 respectively; and the opposite ends of the ram 2 are similarly operatively associated with hydraulic cylinders 7 and 8. Hydraulic energy is applied to the cylinders 5, 6, 7 and 8 by pumps 9 and 10, the pump 9 being driven by an electric motor 11 and the pump 10 by a similar motor 12. In the present instance a pipe 13 connects the cylinders 5 and 8 and is connected also with the pumps 9 and 10 by way of valve controlled fittings 14 and 15 respectively. A second pipe 16 connects the cylinders 6 and 7, and this pipe is connected by valved fittings 17 and 18 respectively with the pumps 9 and 10. The pumps 9 and 10 are preferably of the reversible variable stroke and variable capacity type illustrated, for example, in U. S. Patent 1,924,124, and are attached to circulate pressure liquid through the pipes 13 and 16 so as to move the rams 1 and 2 in opposite directions, the direction of movement of the individual ram depending upon the direction of pump stroke operation. Operation of the rams in the present instance is effected by the operation of one only of the pump and motor units at a time, the other unit being held in reserve. The construction and general mode of operation of the mechanism described above are well understood by those familiar with the art.

In normal operation of this type of steering mechanism, the motor of the active pump unit is continually operated as also is the rotor of the pump. Movement of fluid in the ram system is controlled through the medium of a servo storage motion cylinder device of the character illustrated in Figure 3. This particular unit comprises a casing 21 which contains a cylindrical chamber 22 within which a piston 23 is slidably mounted. The piston 23 has at its opposite ends co-axial cylindrical stems 24 and 25 respectively, which extend through suitably packed openings in the end walls 26 and 27 of the chamber 22. The piston 23 has also an axial bore 28 which extends partially through the stem 24 and completely through the stem 25. This bore receives a valve element 31 which projects beyond the end of the stem 25 and is thereby accessible for actuation from the outside of the casing.

Figures 3, 4:
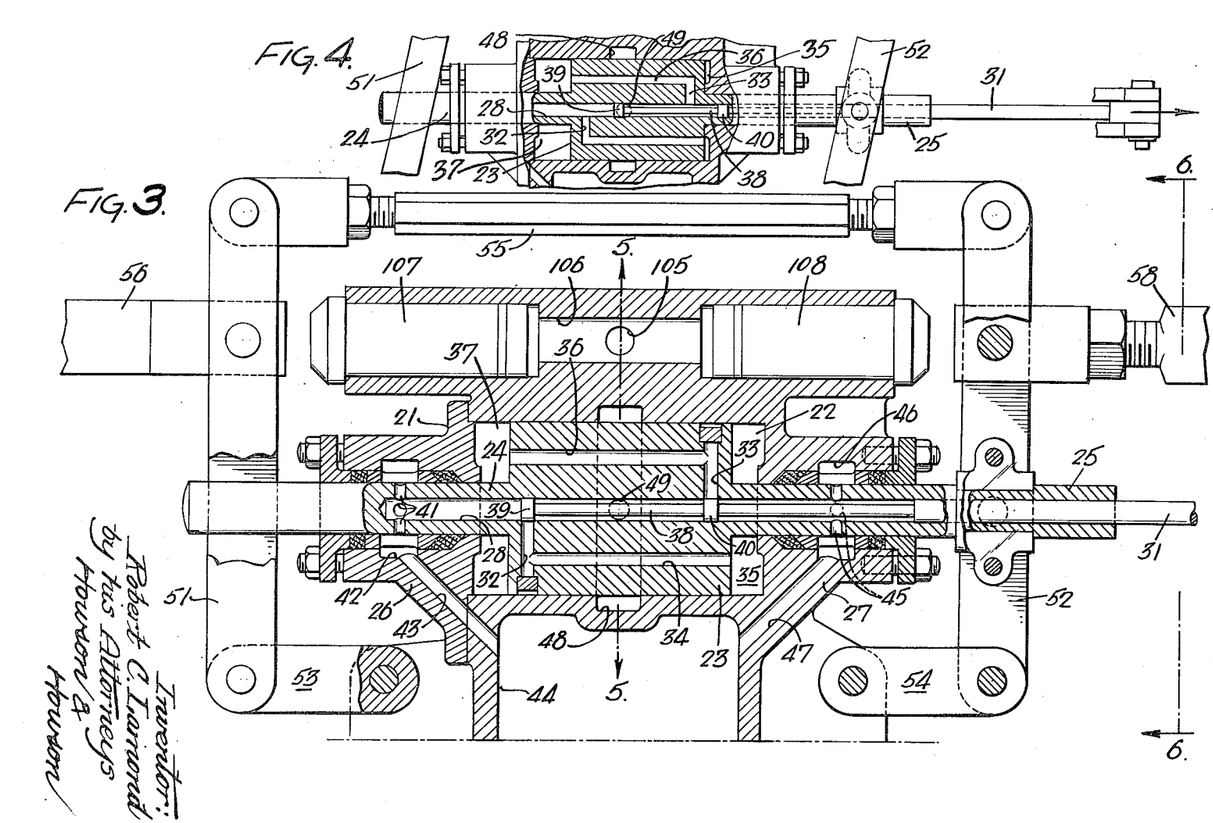
Figure 3 is a longitudinal sectional view of the improved servo storage motion cylinder unit constituting a major element of the control mechanism.
Figure 4 is a reduced fragmentary sectional view showing the parts of the servo unit in a different position of adjustment from that in which they are shown in Figure 3.

From the bore 28 passages 32 and 33 extend radially in the opposite ends of the piston 23, the passage 32 being connected by way of a longitudinal branch 34 with the chamber 35 at the right hand of the piston as viewed in Figure 3; and the passage 33 communicating through a similar extension 36 with the cylindrical chamber 37 at the opposite or left hand of the piston. The valve element 31 has a reduced inner terminal portion 38 and is provided on this reduced portion with collars 39 and 40 respectively, which closely fit the bore 28 and are positioned so as to simultaneously close the ports formed at the junctures of the passages 32 and 33 with the bore. In the neutral position the valve element will be as shown in Figure 3, wherein the collars 39 and 40 operate to close the inner ends of the passages 32 and 33.

Figure 5:
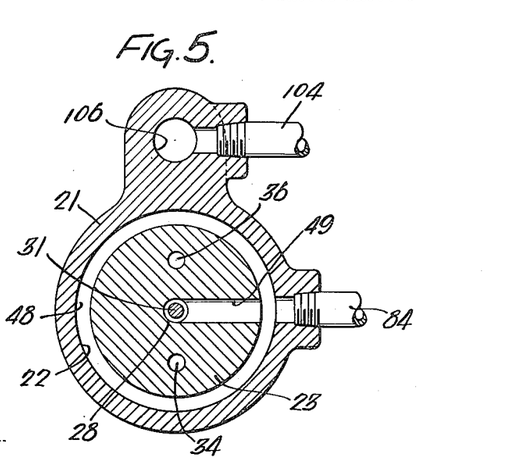
Figure 5 is a sectional view on the line 5—5, of Figure 3.
Figure 6:
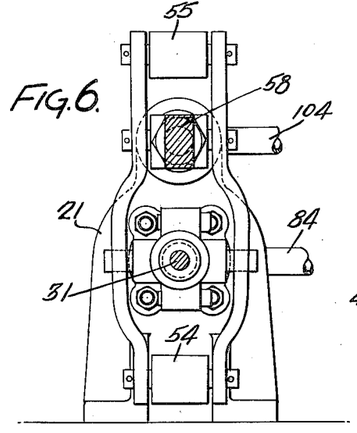
Figure 6 is a sectional view on the line 6—6, of Figure 3.

The inner terminal end of the bore 28 communicates through radial ports 41 with an annular chamber 42 in the end wall structure 26 of casing 21, and this chamber communicates by way of a passage 43 with a make up chamber 44 in the bottom of the casing. Radial ports 45 similar to the ports 41 are provided in the wall of the stem 25 and communicate with an annular chamber 46 in the end wall structure 27 of the casing, and this chamber also communicates with the make up chamber 44 through a passage 47. The wall of the chamber 22 is provided with an annular recess 48, Figs. 3 and 5, and the cylinder 22 is provided with a port 49 which establishes communication between the annular chamber 48, formed around the piston 23 by the recess 48, and the bore 28 of the piston at a point intermediate the collars 39 and 40 of the valve element.

In operation, the chamber 48 is supplied continually with a pressure liquid from a suitable source which may, for example, be an independent hydraulic system containing a pump 50 (see Figures 1 and 2) of the same character as the pumps 9 and 10 and operated from the same motors. This system will also include the make up chamber 44. When the valve element 31 is in the position shown in Figure 3, the fluid on the pressure side of the system is confined in the chamber 48 and the space within the bore 28 of the piston 23 between the collars 39 and 40 and around the reduced portion 38 of the stem. If the valve element 31 is moved to the right, as shown for example, in Figure 4, pressure liquid will be permitted to flow through the passage 33 to the chamber 37 at the lefthand end of the cylinder 22; and the simultaneous connection of the chamber 35 at the right hand end of the cylinder with make up tank 44 by way of passage 34, 32, bore 28, ports 41, chamber 42 and passage 43 will result in a movement of the piston 23 to the right. If the displacement of the valve 31 from neutral position is to the left, the resulting connections between the source of pressure fluid and the chamber 35 and between the chamber 37 and the sump will cause an actuation of the piston 23 to the left.

It will be noted that in each instance the direction of movement of the piston 23 is in the same direction as the initiating adjustment of the valve element 31, so that the piston tends to overtake the valve element. If the initial movement of the valve element is less than the maximum permissible movement of the piston in the cylinder, the operation of the piston will be automatically interrupted when it overtakes the valve and advances into the neutral position with respect to the valve wherein the passages 32 and 33 are closed by the collars 39 and 40. It will be noted, however, that the valve element 31 has freedom for movement in the bore 28 materially in excess of the maximum permissible movement of the piston in the cylinder, and in Figure 4, for example, the valve element is shown in a position well to the right of that which would be required to effect the movement of the piston to the extreme right-hand end of the cylinder.

It will be noted also by reference to Figures 3 and 4 that the ends of the stems 24 and 25 project beyond the walls of the casing 21 and that the stem 24 pivotally is connected to a lever 51, this being connected at the bottom by way of a link 53 with a relatively fixed casing part. A corresponding lever 52 is similarly attached to the casing by a link 54 at the opposite end of the cylinder. The upper ends of the levers 51 and 52 are connected together by an adjustable tie rod 55, so that movements of the piston 23 to right or left of the cylinder 22 have the effect of angularity displacing the levers about the outer ends of the respective links 53 and 54 so that they assume inclined positions to right or left depending on the direction of movement of the piston, the ultimate right hand inclined positions of the levers being shown in Figure 4. The lever 51 is connected by way of a suitable connecting rod 56 with the control element 57 of the pump 9; and a lever 52 is similarly connected by way of a rod 58 with the control element 59 of the pump 10. The neutral position of the piston 23 shown in Figure 3 corresponds to the neutral position of the pump, wherein the operation of the motor produces no pumping action. An adjustment of the piston 23 to right or left as described above will adjust the pump control elements to force pressure liquid through the ram system in one direction or another, depending upon the direction of the adjustment of the piston 23, and the volume of the pump discharge will correspond to the extent of the piston adjustment. This type of pump and its mode of control are well understood in the art.

In the present instance the valve element 31 of the servo unit is connected at its outer end to a lever 61, see Figures 1 and 2, approximately at the midpoint of said lever. One end of this lever is connected through a link 62, arm 63, gear box 64, and shaft 65 to a synchronous motor 66, and in accordance with one conventional practice this motor is electrically connected to a suitable generator 67 operatively connected to a steering wheel 68 located at a remote point. By this means angular movements of the wheel 68 are transmitted by way of the generator 67 and synchronous motor 66 and the aforesaid mechanical connections to the valve 31, with resulting operation of the steering rams 1 and 2 and of the rudder to which these rams are connected. Any other of the standard controls, such as telemotor, shafting or the like, may be used to transmit the motion from the steering station to the steering gear without departure from the present invention.

With further reference to the lever 61, it will be noted that whereas one end of this lever is connected to the link 62 the opposite end is connected through a link 73 with an arm 69 on the lower end of a shaft 75, the upper end of the shaft having attached thereto a lever 74. The outer end of the lever 74 is connected by way of a link 76 with the ram 2. In the initial adjustment of the lever 61 by the motor 66, the link 73 acts as an anchor affording a fixed pivot for the lever 61 about which it may turn under impulse exerted through the link 62 from the said motor. The resulting movement of the rams 1 and 2, however, will be in a direction and of a magnitude that, acting through the link 76, lever 74, shaft 75, and link 73, will actuate the lever 61, this time around the pivotal connection of this lever with the link 62 to return the valve rod 31 of the servo unit to its original or neutral position. This "follow up" movement of the valve stem 31 will cause a corresponding reverse movement of the piston 23, such reverse movement, continuing until this piston overtaking the valve rod 31 in the neutral position of the latter, will cause the passages 32 and 33 to be closed by the sleeves 39 and 40, whereupon the cycle of the servo unit operation will have been completed and the parts will be in the positions in which they are shown in Figure 3. The pump 9 or 10, as the case may be, which was adjusted from neutral to stroke position by the initial movement of the piston 23, will also have been returned to neutral. The rams 1 and 2, however, will remain in the position to which they were moved as a result of the initial adjustment of the valve element 31, and can be brought back to their original positions only by a subsequent reverse actuation or adjustment of the valve element.

The shaft 65 is also operatively connected through a suitable clutch to a trick wheel 77 which, if desired, can be used for manual operation of the shaft independently of the electrical system in the event of failure of the latter. The shaft may also extend to a remote steering station for manual operation from that point. The manual operation of the valve element 31 from the trick wheel 77 or from other remote manual steering position will be identical with that described above under operation of the electrical system.

Figures 7, 8, 9:
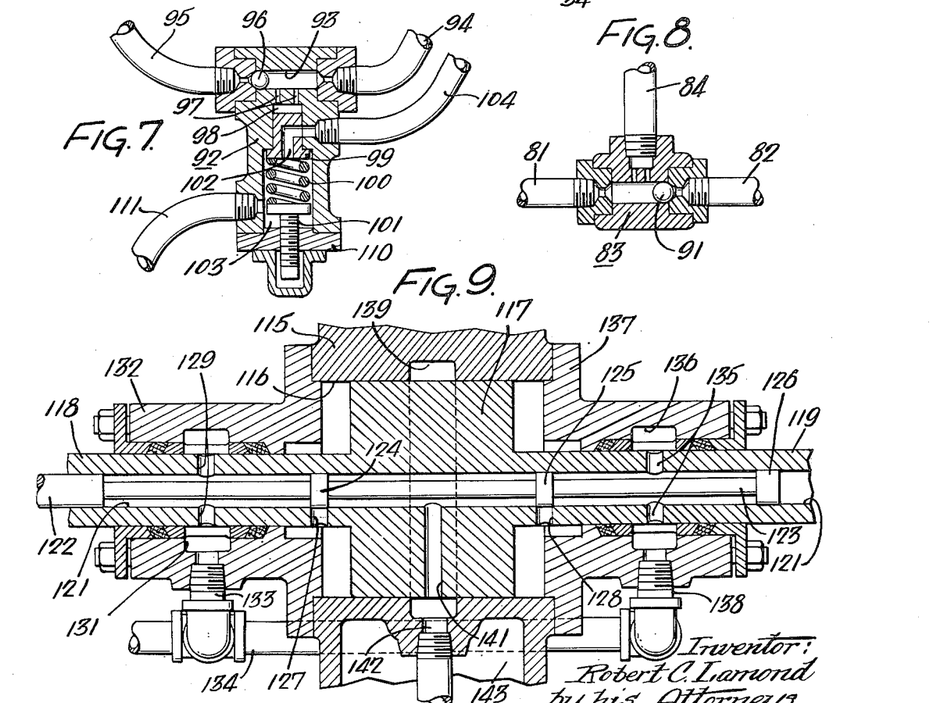
Figure 7 is a sectional view on the line 7—7, of Figure 2.
Figure 8 is a sectional view on the line 8—8, of Figure 2.
Figures 9, 10 and 11 are sectional views illustrating other embodiments of the servo storage motion cylinder unit within the scope of the invention.

With further reference to the hydraulic actuation of the servo piston 23, it will be noted that each of the motors 11 and 12 has operatively associated therewith one of the pumps 50 which provides the hydraulic pressure to the pressure chamber 48 of the servo unit. Each of these pumps is connected through a pipe 81 and 82 respectively, a check valve 83 and a pipe 84 with the pressure chamber 48. A separate check valve for each pump is desirable if the pumps are to be used simultaneously. Each of the pumps also is connected to a suitable make up tank indicated by the reference numerals 85 and 86 through pipes 87 and 88. The check valve 83, as illustrated in Figure 8, functions to block off that one of the pipes 81 and 82 which at the time is connected to the idle pump and motor unit. In Figure 8, for example, the spherical valve element 91 lies at the right hand side of the valve in a position to block the pipe 82, the element having been moved to this position by hydraulic pressure from the pipe 81. The pump and motor unit 11, 50 is thus permitted to apply pressure to the chamber 48 of the servo cylinder. If the operation of the motor pump unit 11, 50 were interrupted and the motor pump unit 12, 50 placed into operation, the valve would automatically operate to prevent the hydraulic medium from entering the pipe 81.

Means is also provided to protect the driving motors from an injurious overload. This means is illustrated in Figures 1, 2 and 3 and includes a valve 92 which is illustrated in detail in Figure 7. As shown in the latter figure, this valve comprises a transverse cylindrical passage 93, the opposite ends of which are connected respectively to pipes 94 and 95. These pipes communicate respectively with the pipes 13 and 16. Within the passage 93 is a spherical check valve element 96 which is free to occupy positions in the ends of the passage. When at the left hand end, as shown in Figure 7, this valve element will close the connection between the passage and the pipe 95; and when at the opposite end of the passage 93 will function similarly with respect to the pipe 94. Hydraulic pressure in either of the pipes will cause the spherical element 96 to move to a position closing off the other pipe so that the hydraulic pressure is directed from the passage 93 through a pair of ports 97, 97 into the chamber 98 in the valve casing. This chamber is occupied by a valve element 99 which is normally held in the position in the chamber shown in Figure 7 by a spring 100. The pressure of this spring may be regulated by adjustment of a screw 101 in the bonnet 110 of the valve casing which screw forms a seat for the end of the spring. The valve element 99 contains a passage 102, which, when the valve element is in the position shown in Figure 7, will establish communication between a chamber 103 of the valve casing and a pipe 104 which, as shown in Figures 1, 2 and 3, extends to a port 105 in a cylinder 106 formed in the present instance in the upper wall of the casing 21 of the servo cylinder. Plungers 107 and 108 occupy the opposite enlarged terminal end portions of the cylinder 106 and the outer ends of these plungers are in operative relation to the levers 51 and 52, or as shown in Figure 3.

With further reference to the valve 92, the chamber 103 is in communication with a pipe 111 which extends to the make up tank 85. Thus, when the valve element 99 is in the position shown in Figure 7, the pipe 104 and therefore the cylinder 106 will be in direct communication with the tank 85, and the chamber 106 will be devoid of pressure. If, however, the pressure in either of the pipes 94 or 95, and therefore in the primary hydraulic system increases to the point where it overcomes the pressure of the spring 100 and displaces the valve element 99 against the pressure of this spring to an extent establishing communication between the pipe 104, and that one of the pipes 94 or 95 through which at the moment hydraulic pressure is applied to the passage 93, then this hydraulic pressure will be applied also to the cylinder 106 between the plungers 107 and 108 and will then force those plungers outwardly toward the respective arms 51 and 52. Since under this condition of operation the levers 51 and 52 must occupy a position removed from the neutral one shown in Figure 3, the hydraulic pressure acting on the pistons 107 and 108 will act to move the levers 51 and 52, and therefore the piston 23, towards the neutral position and to a position wherein the stroke of the primary pump 9 or 10, as the case may be, will be reduced so as to limit the load on the driving motor. Means (not shown) is provided for limiting the outward movement of the pistons 107 and 108 so as to preclude return of the levers and of the pump control element to the neutral or no-stroke position.

In general the above described mechanism and its mode of operation will be readily understood by those familiar with the art. It is to be noted, however, that by reason of the freedom for over travel of the valve 31, afforded by the aforedescribed construction of the storage motion cylinder unit, provision is made within the structure of the valve itself for the necessary "storage motion." This is accomplished by making the over travel of the valve, previously mentioned, correspond to the equivalent movement of the rudder from one extreme angle to the other. Assume, for example, that the servo piston 23 is in the mid position, as shown in Figure 3, the valve 31 is in the neutral position as also shown, and that the rams 1 and 2 are as shown in Figure 1 which correspond to the rudder centered position. If now full right (or left) rudder is called for, the valve 31 will be moved in the appropriate direction to an extent required to bring the piston 23 to the extreme end of the cylinder 22. This movement may be a relatively slow one in which the valve and piston move substantially simultaneously so that at the end of the movement the valve and piston are relatively in the same neutral position from which they started. This, however, is not the maximum permissible movement of the valve in that direction with respect to the piston, so that in the event of power failure while the vessel is underway or under any other conditions wherein the rudder would take over, and even if the rudder were forced to reverse its position from the full right or left position to the full extent of its maximum permitted angular movement, the valve would be free to move under action of the followup connections and with the rudder as the driver to any extent required to accommodate this rudder shift.

The device also permits "full advance" of the valve with respect to the piston over the full extent of rudder movement from one extreme position to the other. If, for example, the rudder is full left and it be desired to shift to a position to the right of center or, in fact, to full right, the steersman may throw the wheel over without interference or interruption to the full extent required to effect the desired rudder movement and in advance of the latter. This "full advance" characteristic arises from the fact that the valve element has freedom for movement with respect to the piston in excess of the maximum travel of the piston in the cylinder.

The "storage motion," which is provided by affording over travel for the servo unit valve element so that it is free to move to the full extent required by the movement of the rudder when the latter constitutes the valve operating member, thus becomes a simple built-in functional part of the servo unit itself and eliminates the necessity for the springs and complicated mechanical cam units previously used to afford the required safety factor. The device not only effects a material simplification of the mechanical control parts of the steering gear, but also reduces the turning force requirements of the mechanical control to a minimum, so as to accommodate the limited electric power supply of the synchronous control system previously mentioned which is used to transmit the turning movement of the steering wheel to the mechanical control at the steering gear. It will be apparent also that the device permits the helmsman to operate the steering wheel at a much higher rate of speed than the rudder movement.

There may be considerable modification in the structure of the servo storage motion cylinder unit without departure from the principle of the invention, and one such modification is illustrated in Figure 9. This figure comprises a casing 115 having a cylindrical chamber 116 in which is installed a piston 117. This piston has axial extensions or stems 118 and 119 and an axial bore 121 which extends through the stems 118, 119 into the body of the piston 117. The bore 121 receives a valve element 122 which has a reduced terminal end portion 123 which in this case is provided with three collars, 124, 125 and 126. Each of the stems 118 and 119 has a port, 127 and 128 respectively, which communicates with the cylinder 116 at the opposite ends of the piston 117; and the collars 124 and 125 of the valve element are arranged so that they may simultaneously close the ports 127 and 128 as illustrated. The stem 118 has additional ports 129 which establish communication between the bore 121 and an annular chamber 131 in the head member 132 of the casing 115. It will be noted that the stem 118 passes through the head member 132 and that packing means is provided between the said member and the stem at opposite sides of the chamber 131. The chamber 131 communicates through a duct 133 with a pipe 134 which is connected to a source of hydraulic pressure, such, for example, as the pump 50 of the previously described embodiment.

The stem 119 is also provided with ports 135 which establish communication between the bore 121 and an annular chamber 136 in the head member 137 of the casing 115. The stem 119 extends through the head member, and suitable packing is provided at opposite sides of the chamber 136. This chamber is also connected through a duct 138 with the pipe 134 and through this pipe with the source of hydraulic pressure. It will be noted that the ports 129 are located between the end of the larger portion of the valve stem 122 and the collar 124 for confinement of the hydraulic fluid; and that the ports 135 are similarly located between the collars 125 and 126 of the valve stem. The wall of the cylinder 116 is provided with a centrally located peripheral recess 139 and the surface of the piston closes this recess to form an annular chamber embracing the piston. The piston is provided with a passage 141 which establishes communication between the chamber 139 and the portion of the bore 121 which lies between the collars 124 and 125. The chamber 139 is also connected through a port 142 with a make up tank 143 for the hydraulic medium.

As shown in Figure 9 the piston is in the neutral position, the ports 127 and 128 are closed and the hydraulic pressure is confined to the limited areas of the bore 121 between the body of the valve element and the collar 124 and between the collars 125 and 126. Displacement of the valve to the right as viewed in Figure 9 will permit the hydraulic medium to flow through the port 127 to the left end of the piston 117, and will simultaneously establish communication between the right end of the piston and the make up tank by way of the port 128, the passage 141 and port 142. Movement of the piston to the right will result. A corresponding movement of the piston to the left will be effected by a displacement of the valve element to the left from neutral position. The operation is essentially the same as that of the servocylinder illustrated in Figure 3 and described above.

As in the cylinder of Figure 3 the valve element 122 is entirely free to move to right or left to an extent beyond that required to carry the piston to the extreme ends of its travel in the cylinder 116. This over travel of the valve element affords the "storage motion" described above.

Figure 10:
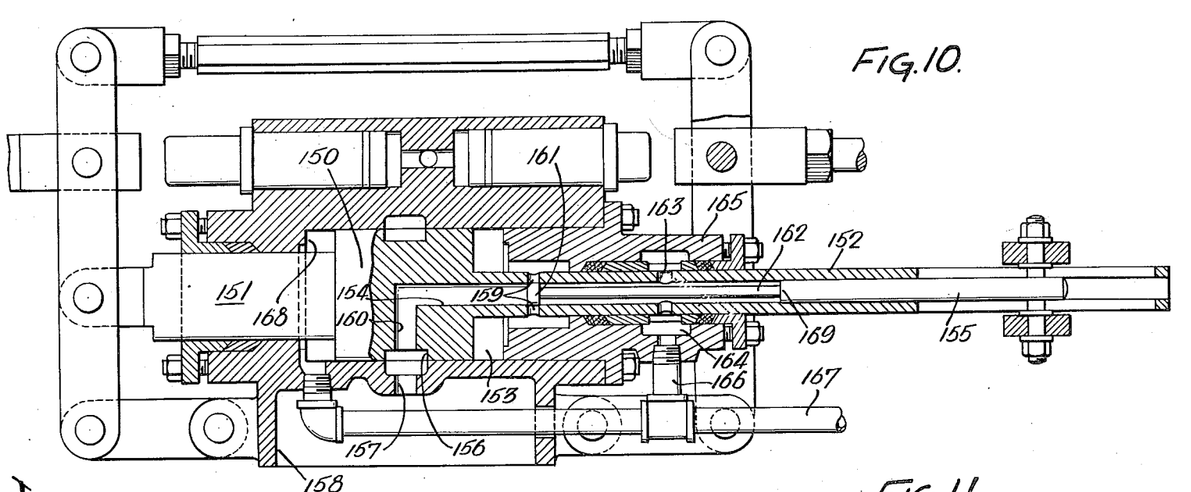

Another embodiment of the servo storage motion cylinder unit is disclosed in Figure 10 of the drawings. In this case the piston 150 has the usual stem-like axial extensions 151 and 152 which extend through the ends of the cylinder 153 in which the piston operates. The axial bore 154 which receives the valve element 155 is confined in this instance to the stem 152 and to the left-hand end of the piston body, the inner end of the bore communicating through the radial passage 160 with a circumferential chamber 156. This chamber communicates by way of a port 157 with a make up tank 158. The stem 152 is provided with ports 159 which establish communication between the bore 154 and the right end of the cylinder 153; and these ports 159 are adapted to be closed by a collar 161 on the inner end of the reduced portion 162 of the valve element. The stem 152 has a second series of ports 163 which establish communication between the bore 154 and an annular chamber 164 in the head member 165 of the cylinder 153. This chamber communicates through a nipple 166 with a pipe 167 which is connected to the source of hydraulic pressure, not shown. The pipe 167 is also connected by way of a port 168 with the left hand end of the cylinder 153. Thus hydraulic pressure is applied simultaneously to the left end of the cylinder 153 and to the portion of the bore 154 which lies between the terminal collar 161 of the valve stem and the shoulder 169 at the inner end of the body of the valve element. Movement of the valve element to the left will establish connection between the right end of the cylinder 153 and the pressure source and by reason of the fact that this end of the piston is of greater effective area than the left end of the piston because of the relatively large size of the stem 151 as compared to the stem 152, the piston will be forced to the left. Movement of the valve element to the right will connect the right end of cylinder 153 with the sump and will permit the pressure fluid in the left end of the cylinder to force the piston to the right.

Figure 11:
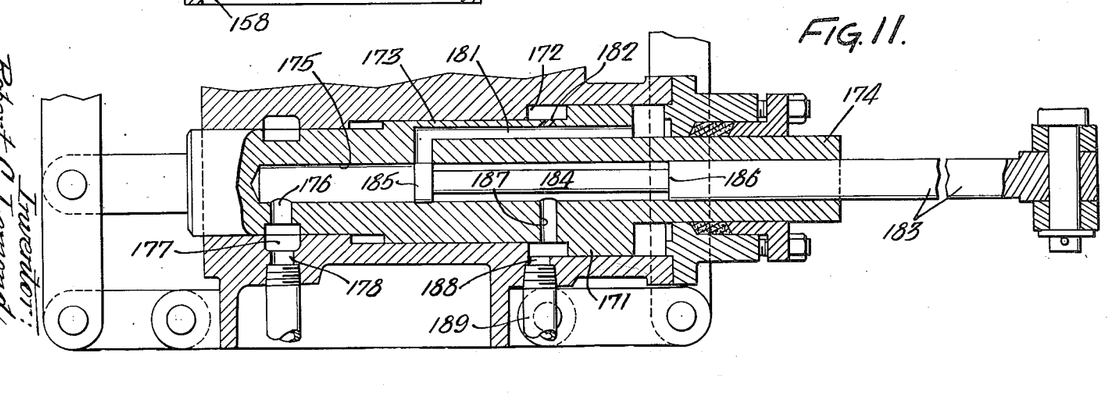

In the embodiment of the servo storage motion cylinder shown in Figure 11 a somewhat similar principle is employed. In this case the piston 171 operates in a cylinder 172 and has axial stem portions 173 and 174 which extend through the end walls of the cylinder. An axial bore 175 extends completely through the stem 174 and the body of the piston and through the major part of the stem 173. The inner end of this bore communicates through a port 176, annular chamber 177 and port 178 with a suitable make up tank. The bore 175 also communicates through a passage 181 with the right hand end of the cylinder 172. A port 182 establishes communication between the left end of the cylinder 172 and the passage 181. The bore 175 receives a valve element 183 having an inner portion 184, of relatively small diameter and having at its inner extremity a collar 185 which is adapted to close the passage 181 as illustrated in the drawing. Between the collar 185 and the shoulder 186 at the inner end of the reduced portion 184 of the valve element, the piston is provided with a port 187 which establishes communication between the bore 175 and the inner end of the cylinder 172, and this inner end of the cylinder is also connected through a port 188 with a pipe 189, which is connected to the source of hydraulic pressure. When the valve is moved to the left as viewed in Figure 11 the hydraulic pressure will be admitted to the right end of the cylinder 172 as well as to the left end, and since the right end of the piston has the greater effective area exposed to the pressure, the piston will be moved to the left. If the valve is moved to the right from the neutral position the right end of the cylinder will be connected with the make up tank and the pressure in the left end of the cylinder will then act to force the piston to the right.

Figures 12, 13, 15:
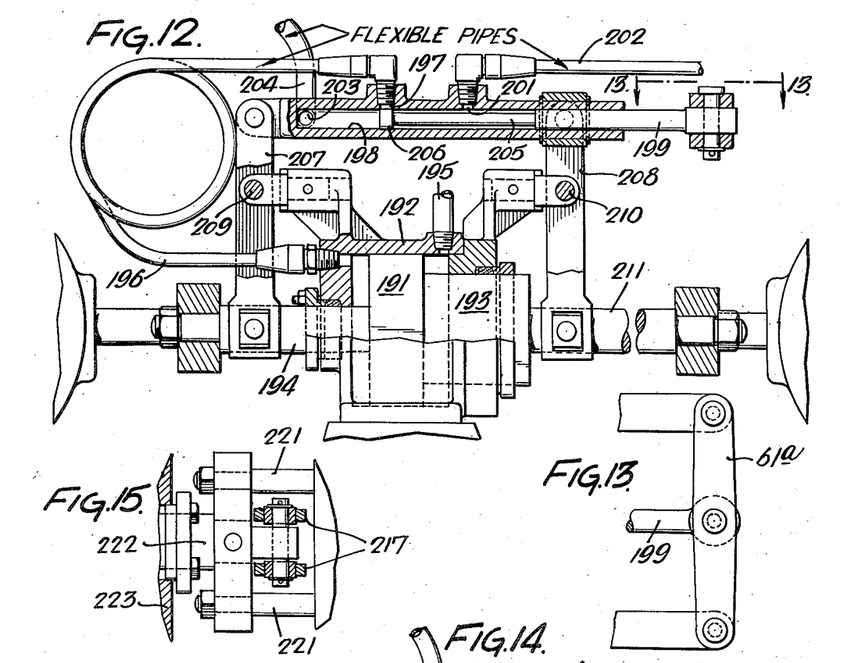
Figure 12 is a fragmentary sectional view illustrating still another form of servo unit incorporating the principles of the invention.
Figure 13 is a fragmentary plan view from the line 13—13 of Figure 12.
Figure 15 is a sectional view on the line 15—15 of Figure 14.

It is not necessary in my improved servo storage motion cylinder unit that the valve element be mounted within the piston, and in Figures 12–15, inclusive, I have illustrated two embodiments of the unit wherein the valve element is mounted in a separate casing. With reference to Figures 12 and 13, for example, the piston 191 operates in a cylinder 192, the piston being of the differential type by reason of the fact that the right hand stem extension 193 which passes through the end wall of the cylinder is of greater diameter than the stem extension 194 which passes through the opposite end wall of the cylinder. The right hand end of the cylinder is connected with the source of hydraulic pressure through a pipe 195 whereas the opposite end of the cylinder is connected through a pipe 196 with a port 197 in the wall of a valve casing 198 in which is mounted a valve element 199. A second port 201 in this cylinder wall is connected by way of a pipe 202 with the source of hydraulic pressure; and a third port 203 is connected through a pipe 204 with a make up tank of the character previously described.

The valve 199 has a reduced end portion 205 which terminates at its free end in an enlarged collar 206 which fits the bore of the cylinder 198. The valve casing 198 is supported on the upper ends of a pair of parallel levers 207 and 208 which are pivotally mounted at 209 and 210 on the fixed structure of the unit. The lower end of the lever 207 is attached to the stem 194 and the lower end of the lever 208 to the reduced extension 211 of the piston extension 193, thus any movement of the piston will act through the lever 207 and 208 to move the valve casing 198 in an opposite direction. The pipes 196, 204 and 202 are flexible to permit this movement of the casing.

When the valve 199 is in the neutral position as shown in Figure 12 the port 197 will be closed by the sleeve 206. If the valve is moved to the right from this position, the port 197 will be connected to the make up tank by way of the port 203 as also will be the left hand end of the piston cylinder 192. Hydraulic pressure at the opposite side of the piston admitted through the pipe 195 will force the piston to the left and this movement of the piston will also result in a movement to the right of the valve casing 198. If the valve element 199 is shifted to the left from the neutral position, hydraulic pressure from the pipe 202 will be applied through the ports 201 and 197 and through the pipe 196 to the left end of the cylinder 192. This pressure acting on the left end of the piston, which is of greater effective area than the right end of the piston exposed to the hydraulic pressure in the corresponding end of the cylinder 192, will move the piston to the right and effect a simultaneously left hand adjustment of the valve casing 198. It will be apparent that the operation is essentially the same as that of the other embodiments of the unit described above.

Figure 14:
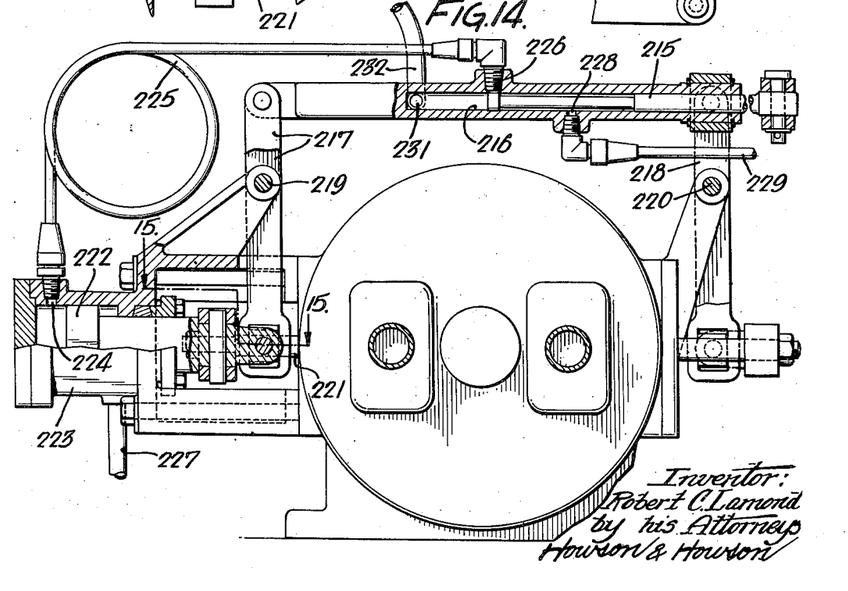
Figure 14 is a fragmentary perspective view illustrating still another form of servo unit within the scope of the invention.

In the embodiment of Figures 14 and 15 the valve element 215 operates in a separate cylinder 216 which is supported on the upper ends of parallel levers 217 and 218. These levers which are pivotally supported at 219 and 220, respectively, have their lower ends connected to the stem 221 of a piston 222 which operates in a cylinder 223. One end of the cylinder is connected through a port 224 and flexible pipe 225 with a port 226 in the wall of the cylinder 216. The opposite end of the cylinder 223 is connected through a pipe 227 with a source of hydraulic pressure. The cylinder 226 has a port 228 in the wall thereof connected through a pipe 229 with the source of hydraulic pressure; and a port 231 in the opposite end of the cylinder 216 connects that cylinder through a pipe 232 with a make up tank. When the valve 215 is in the neutral position it closes the port 226, as illustrated when the valve is moved to the right from this position the left hand end of the cylinder 223 will be connected through port 224, pipe 225, ports 226 and 231 and pipe 232 with the make up tank so that the pressure admitted to the opposite end of the cylinder 223 through the pipe 227 will force the piston 222 to the left. Left hand movement of the piston will cause a movement to the right of the valve cylinder 216. If the valve 215 is moved to the left from the neutral position hydraulic pressure admitted by way of the pipe 229 and port 228 will be applied through the pipe 225 to the left end of cylinder 223, and since the left end of the piston 222 exposed to this pressure is of greater effective area than the opposite end of the piston exposed to the pressure admitted through pipe 227 the piston will be forced to the right, such piston movement causing a left hand movement of the cylinder 216. The mode of operation will be apparent.

I claim:

1. The combination with a ram and cylinder group constituting a fluid motor, of an hydraulic system including a pump for actuating said motor and a valve for controlling operation of the pump, means including follow-up devices for operatively connecting the valve and motor so that each movement of the valve from a normal position will be accompanied by a movement of the motor in predetermined ratio and by a return of the valve to the normal position, manual actuating means for the valve, differential means affording actuations of the valve by the follow-up and manual means each independently of the other, means limiting overall movement of the motor, and means affording free movements of the valve in advance of the motor to the full extent required for actuation of the motor by the pump over the limits of said overall movement.

2. The combination with a ram and cylinder group constituting a fluid motor having limited overall travel, a pump for actuating said motor, adjustable control means for said pump, a second fluid motor operatively connected to the control means to actuate the latter, a valve for controlling said second motor, manual operating means for the valve, means for connecting the valve to the first named motor, and differential means interposed between the latter connecting means and the manual operating means affording actuations of the valve from the first said motor and manual means each independently of the other, and means affording unrestrained movement of said valve in advance of the second motor and the movement thereof to the full extent required to effect actuation of the first named motor over the limits of its travel, said means also affording unrestrained movement of the valve under actuation by uncontrolled movements of the first named motor over the full limit of its travel.

3. In steering apparatus, a ram and cylinder group constituting a reversible fluid motor wherein the fluid actuated member has limited overall travel, a reversible discharge pump for selectively actuating the motor in the reverse directions, adjustable discharge control means for the pump, a second reversible fluid motor connected to the control means for actuating the latter, a manually actuated control valve for the second motor operative in a normal position to immobilize the said second motor in position to interrupt discharge of the pump, means whereby movement of the second motor resulting from an adjustment of the control valve from the normal position automatically effects a relative resetting of the valve to interrupt the operation of the said motor, follow-up means operated by the motor first named for actuating the valve toward the normal position of said discharge control means to reduce the discharge of the pump when the first mentioned motor has been operated to the desired extent, and means affording said control valve free movement independently of the second motor in either direction from the said normal position to the extent of its maximum independent displacement under actuation by the first named motor moving over the full limit of its travel.

4. In combination, a pump, a ram and cylinder group constituting a fluid motor actuated by the pump and comprising an adjustable control means, a member actuated by the motor and having a predetermined limited travel, an hydraulic cylinder, a plunger operative by fluid pressure in the cylinder and connected to the pump control means, a valve controlling the operation of the plunger, means whereby adjustment of the valve within a predetermined limited range effects a movement in fixed ratio of the plunger with subsequent interruption in the flow of actuating fluid to the cylinder, the said limited range of adjustment of the valve being such as to afford full advance movement of the valve of sufficient scope to effect movements of the motor actuated member over the full extent of its limited travel, means for actuating the valve including a differential device, manually actuated means connected to one side of said differential, a follow-up actuated by the motor and connected to the other side of the differential, said follow-up being effective to return the valve to a position from which it has been adjusted by the manual means, and means affording free movement of the valve independently of the plunger and irrespective of the position of the latter under uncontrolled actuation through said motor and follow-up by said motor actuated member over the full limits of the travel of the latter.

5. The combination according to claim 4 wherein the said pump discharge is reversible for reverse actuations of the ram and cylinder group, and wherein further the adjustable control means is operable in opposite directions from a neutral position to regulate the direction of said actuations, the said control means actuating plunger having a normal intermediate position in the cylinder corresponding to the neutral position of the pump control means and said valve having a normal intermediate position wherein it prevents flow of actuating fluid to both ends of the plunger, said follow-up being operative to return the valve to the said normal position after each displacement thereof from said position by the manual means.

6. The combination according to claim 5 wherein the valve is mounted for axial movement in said plunger and wherein further the valve cooperates with ports in the plunger for selectively controlling flow of fluid to the opposite ends of the plunger.

7. The combination according to claim 6 wherein the valve is free for axial movement with respect to the plunger materially in excess of the limited range of movement of the plunger in the cylinder.

References Cited in the file of this patent

UNITED STATES PATENTS

| | | |
|---|---|---|
| 1,585,529 | Boving | May 18, 1926 |
| 1,986,640 | Lamond | Jan. 1, 1935 |
| 1,998,189 | Erling | Apr. 16, 1935 |
| 2,029,378 | Koons | Feb. 4, 1936 |
| 2,111,659 | Benedek | Mar. 22, 1938 |
| 2,184,665 | Ernst | Dec. 26, 1939 |
| 2,283,138 | Hagemann | May 12, 1942 |

FOREIGN PATENTS

| | | |
|---|---|---|
| 562,326 | France | Nov. 8, 1923 |